United States Patent
Lorey

(10) Patent No.: US 9,140,328 B2
(45) Date of Patent: Sep. 22, 2015

(54) VEHICLE VIBRATION DEVICE, VEHICLE SEAT AND VEHICLE CAB

(71) Applicant: GRAMMER AG, Amberg (DE)

(72) Inventor: Konstantin Lorey, Schmidgaden (DE)

(73) Assignee: GRAMMER AG (DE)

( * ) Notice: Subject to any disclaimer, the term of this patent is extended or adjusted under 35 U.S.C. 154(b) by 0 days.

(21) Appl. No.: 14/276,122

(22) Filed: May 13, 2014

(65) Prior Publication Data

US 2014/0339872 A1 Nov. 20, 2014

(30) Foreign Application Priority Data

May 14, 2013 (DE) .......................... 10 2013 104 926

(51) Int. Cl.
| | |
|---|---|
| B60N 2/02 | (2006.01) |
| F16F 15/02 | (2006.01) |
| B60N 2/50 | (2006.01) |
| B60N 2/52 | (2006.01) |
| B62D 33/06 | (2006.01) |

(52) U.S. Cl.
CPC .............. *F16F 15/022* (2013.01); *B60N 2/502* (2013.01); *B60N 2/509* (2013.01); *B60N 2/522* (2013.01); *B60N 2/525* (2013.01); *B60N 2/527* (2013.01); *B62D 33/0608* (2013.01)

(58) Field of Classification Search
CPC ....... B60N 2/501; B60N 2/522; B60W 30/20; B60G 2202/42; B60K 6/48; B60P 3/08; G07B 15/063; B62D 1/28; G01S 13/931; G01C 21/28
USPC ........ 296/65.02; 180/300; 248/562, 636, 638; 267/140.13, 141
See application file for complete search history.

(56) References Cited

U.S. PATENT DOCUMENTS

| | | | |
|---|---|---|---|
| 2,725,078 A | 11/1955 | Glancy | |
| 3,148,869 A | 9/1964 | Peterson | |
| 4,526,258 A * | 7/1985 | Huber | 192/85.15 |
| 4,531,761 A * | 7/1985 | von Sivers | 280/785 |

(Continued)

FOREIGN PATENT DOCUMENTS

| | | |
|---|---|---|
| CH | 138281 | 2/1930 |
| DE | 1287453 | 1/1969 |

(Continued)

OTHER PUBLICATIONS

Official Action (no English translation available) for German Patent Application No. 102013104926.5 dated Apr. 2, 2014, 8 pages.

*Primary Examiner* — Kiran B Patel
(74) *Attorney, Agent, or Firm* — Sheridan Ross P.C.

(57) ABSTRACT

The invention relates to a vehicle vibration device of a vehicle seat or of a vehicle cab, comprising a lower part and an upper part which can be deflected relative to this lower part, in which device the upper part and the lower part are interconnected in a spring-loaded manner by means of at least one suspension apparatus and in which the suspension apparatus comprises a deformable fluid-spring part having a flexible pressure chamber element and a deformation apparatus having deformation elements, the deformable fluid element being deformed at least in part by the deformation elements when the upper part is deflected relative to the lower part, and wherein, according to the invention, an additional anti-abrasion element is arranged between the flexible pressure chamber element and the deformation elements.

8 Claims, 2 Drawing Sheets

(56) References Cited

U.S. PATENT DOCUMENTS

| | | | |
|---|---|---|---|
| 5,876,085 A * | 3/1999 | Hill | 296/65.02 |
| 6,857,674 B2 * | 2/2005 | Chareyre | 296/1.03 |
| 7,568,675 B2 * | 8/2009 | Catton | 248/588 |
| 8,439,420 B2 * | 5/2013 | Cantor et al. | 296/68.1 |
| 8,632,061 B2 * | 1/2014 | Nemoto | 267/140.14 |
| 2010/0117411 A1 * | 5/2010 | Fujita et al. | 297/217.1 |
| 2010/0276959 A1 * | 11/2010 | Jang | 296/35.1 |
| 2011/0001342 A1 * | 1/2011 | Deml et al. | 297/338 |
| 2011/0277433 A1 * | 11/2011 | Sugden et al. | 56/10.1 |
| 2011/0278894 A1 * | 11/2011 | Lorey | 297/344.15 |
| 2011/0298266 A1 * | 12/2011 | Haller | 297/344.12 |
| 2012/0007293 A1 * | 1/2012 | Bauer et al. | 267/120 |
| 2012/0091773 A1 * | 4/2012 | Lorey | 297/344.19 |
| 2012/0145875 A1 * | 6/2012 | Haller et al. | 248/636 |
| 2013/0112839 A1 * | 5/2013 | Kato et al. | 248/562 |
| 2013/0341484 A1 * | 12/2013 | Yamada et al. | 248/636 |

FOREIGN PATENT DOCUMENTS

| | | |
|---|---|---|
| DE | 2016973 | 10/1970 |
| DE | 2756624 | 6/1979 |
| DE | 2059720 | 6/1980 |
| DE | 3517345 | 11/1986 |
| DE | 3831724 | 3/1990 |
| DE | 4037289 | 5/1992 |
| DE | 3686619 | 4/1993 |
| DE | 3785493 | 10/1993 |
| DE | 102006016140 | 10/2007 |
| DE | 102010037842 | 3/2012 |
| DE | 102010055342 | 6/2012 |
| DE | 102010055344 | 6/2012 |
| DE | 102011085879 | 5/2013 |
| EP | 1643155 | 4/2006 |
| JP | S62-18346 | 1/1987 |
| JP | S62-18347 | 1/1987 |

* cited by examiner

VEHICLE VIBRATION DEVICE, VEHICLE SEAT AND VEHICLE CAB

CROSS-REFERENCE TO RELATED APPLICATIONS

This application claims the benefit of German Patent Application No. 10 2013 104 926.5 filed on May 14, 2013, the disclosure of which is incorporated herein by reference.

FIELD

The invention relates to a vehicle vibration device of a vehicle seat or of a vehicle cab, comprising a lower part and an upper part.

BACKGROUND

Generic vehicle vibration devices are well known from the prior art. Offenlegungsschrift DE 10 2010 055 342 A1, for example, discloses a vehicle seat comprising a vehicle vibration device, in which a spring apparatus, more particularly a horizontal spring apparatus, comprises a longitudinally extending fluid spring element to which compressive forces can be applied by a deformation apparatus to deform the fluid spring element, so as to be able to mount in particular a seat surface of the vehicle seat in a spring-loaded manner with respect to a bodywork of a vehicle. For this purpose, the ends of the longitudinally extending fluid spring element are for example fixed to a seat-surface-side part and the deformation apparatus is fixed to a bodywork-side part, such that the spring apparatus not only has a spring effect, but also a damping effect between the seat surface and the bodywork. When the vehicle vibration device is configured accordingly, this suspension apparatus can also be arranged to act between a vehicle cab and the bodywork.

SUMMARY

The invention relates to a vehicle vibration device of a vehicle seat or of a vehicle cab, comprising a lower part and an upper part, which can be deflected relative to this lower part, in which device the upper part and the lower part are interconnected in a spring-loaded manner by means of at least one suspension apparatus and in which the suspension apparatus comprises a deformable fluid spring part having a flexible pressure chamber element and a deformation apparatus having deformation elements, the deformable fluid element being deformed by the deformation elements at least in part when the upper part is deflected relative to the lower part.

The invention also relates to a vehicle seat comprising a seat part, a backrest part and a seat substructure, in which seat the seat substructure is arranged on a bodywork part of a motor vehicle.

The invention further relates to a vehicle cab of a motor vehicle, comprising a vehicle vibration device for the spring-loaded mounting of the vehicle cab on a bodywork part of the motor vehicle.

Generic vehicle vibration devices are well known from the prior art. Offenlegungsschrift DE 10 2010 055 342 A1, for example, discloses a vehicle seat comprising a vehicle vibration device, in which a spring apparatus, more particularly a horizontal spring apparatus, comprises a longitudinally extending fluid spring element to which compressive forces can be applied by a deformation apparatus to deform the fluid spring element, so as to be able to mount in particular a seat surface of the vehicle seat in a spring-loaded manner with respect to a bodywork of a vehicle. For this purpose, the ends of the longitudinally extending fluid spring element are for example fixed to a seat-surface-side part and the deformation apparatus is fixed to a bodywork-side part, such that the spring apparatus not only has a spring effect, but also a damping effect between the seat surface and the bodywork. When the vehicle vibration device is configured accordingly, this suspension apparatus can also be arranged to act between a vehicle cab and the bodywork.

The object of the invention is to develop generic vehicle vibration devices to have fewer maintenance requirements and greater stability.

This object of the invention is achieved by a vehicle vibration device of a vehicle seat or of a vehicle cab, comprising a lower part and an upper part, which can be deflected relative to this lower part, in which the upper part and the lower part are interconnected in a spring-loaded manner by means of at least one suspension apparatus and in which the suspension apparatus comprises a deformable fluid spring part having a flexible pressure chamber element and a deformation apparatus having deformation elements, the deformable fluid element being deformed by the deformation elements at least in part when the upper part is deflected relative to the lower part, and wherein, according to the invention, an additional anti-abrasion element is arranged between the flexible pressure chamber element and the deformation elements.

According to the invention, owing to the additional anti-abrasion element the flexible pressure chamber element no longer comes into direct contact with the deformation elements, thereby drastically reducing the risk of premature or respectively rapid wear of the flexible pressure chamber element. As a result, the length of time between maintenance can be selected to be considerably longer. Moreover, the stability of the vehicle vibration device is on the whole significantly increased.

In this regard, the flexible pressure chamber element is both expandable, in particular in terms of the circumference thereof, and flexible or respectively bendable, so as to give the suspension apparatus the desired suspension properties.

Since the flexible pressure chamber element can be acted upon with various pressures, different spring characteristics can additionally be attained on the suspension apparatus.

Ideally, by means of the flexible pressure chamber element, the suspension apparatus also inherently has very good damping properties so as to be able to effectively damp the upper part and in particular to effectively prevent the build-up of vibrations in the vehicle vibration device. In addition, these damping properties can be effectively modulated by pressures that are selected to be different.

The flexible pressure chamber element is ideally designed as a compression-resistant, expandable tube element, whereby it can be constructed to be very flat and can, in structural terms, be integrated well into the vehicle vibration device. In this respect, the deformable fluid element is an elongate deformable fluid element.

In this respect, a pneumatic muscle can be provided on the vehicle vibration device by means of the deformable fluid spring part in order to allow in particular a horizontal vibration of the upper part, and also for damping purposes. A flexible and expandable casing element for such a pneumatic muscle is thus achieved by means of the flexible pressure chamber element.

Within the meaning of invention, the term "vehicle vibration device" describes a device by means of which the deflectable upper part can be mounted so as to vibrate horizontally, relative to the lower part, in particular in the vehicle longitudinal direction and/or in the vehicle width direction. In this respect, the present suspension apparatus is also a horizontal suspension apparatus.

Additionally or alternatively, a vertical suspension apparatus can also be achieved to allow the upper part to also be deflected, relative to the lower part, in a vertically vibrating manner in the vehicle height direction.

In this regard, the present upper part can be a component of the vehicle vibration device that faces either a seat part of the vehicle seat or a cab floor of the vehicle cab. However, it can alternatively be defined by a component of the vehicle seat or of the vehicle cab.

The corresponding lower part is preferably a component of the vehicle vibration device that faces the bodywork. The vehicle vibration device can be constructed with considerably fewer components if the lower part is a component of the bodywork.

However, it is also possible in a corresponding embodiment of the vehicle vibration device to assign the lower part and the upper part the other way around. In other words, the lower part might also be fastened on the seat-part side and the upper part on the bodywork side.

Although the stability of the vehicle vibration device could be increased by a flexible pressure chamber element having relatively thick walls, this would make the flexible pressure chamber element more rigid. As a result, however, this would disadvantageously impair in particular the suspension properties, but the damping properties too.

Naturally, said additional anti-abrasion element can be configured in many different ways.

A preferred variant provides that the anti-abrasion element is produced from a cellular polyurethane, even though a cellular material structure may appear illogical for the present use in preventing wear.

It has been found, however, that an anti-abrasion element made of a cellular polyurethane barely restricts the expansion movements of the flexible pressure chamber element, is additionally very durable in the long term, and moreover can very good anti-wear properties can still be achieved.

This is the case in particular when the anti-abrasion element is produced from Cellasto® or Sylomer®. Materials of this type have proven to be particularly abrasion-resistant and tear-proof and thus can also ensure extremely high durability in the long term as anti-abrasion elements in the context of the invention.

Naturally, other materials, for example compact elastomers such as PU, PVC or the like, can also be used in conjunction with the anti-abrasion element, if this appears meaningful for example with regard to special flexible pressure chamber elements.

One variant, which has a very simply designed structure but is still very effective, provides that the anti-abrasion element has a tubular protective sleeve element in which at least part of the deformable fluid spring part is arranged.

A tubular protective sleeve element of this type can be assembled in an exceptionally simple manner in particular on a tubular pressure chamber element, in that said sleeve element is pulled over the tubular casing part of the flexible pressure chamber element.

Particularly in order to be able to adequately protect the deformable fluid element from mechanical frictional wear, the anti-abrasion element of course only has to be arranged around the outside of the flexible pressure chamber element in the contact region between the deformation elements and the flexible pressure chamber element.

However, if the anti-abrasion element is loosely pulled over the flexible pressure chamber element as far as over end enclosures thereof, structurally speaking it is particularly easy to prevent undesired slipping of the anti-abrasion element with respect to the flexible pressure chamber element without additional fastening elements being required for this purpose.

At these end enclosures, the pressure chamber element is closed in a rigid and pressure-tight manner with respect to its ends, the end enclosures still readily being able to comprise fastening means for fastening to the upper part or lower part of the vehicle vibration device.

As an alternative to the tubular protective sleeve element, the flexible pressure chamber element can also be non-detachably coated with a cellular polyurethane or the like.

The present protective effect can also be achieved, for example, by the anti-abrasion element consisting of a flock coating. In this case, preferably a cellular polyurethane is flocked, using a method known per se, onto the outside of the casing surface as a wear-resistant coating. Such a flock coating can also be very flexible and in this respect can participate in expansion or bending movements of the deformable fluid spring part.

In addition, it is advantageous if the anti-abrasion element comprises means for reducing friction with respect to the deformation elements. This alone can further reduce mechanical wear. Means of this type for reducing friction can comprise for example powdered substances, oils, greases or the like, which act between the deformation elements and the casing surface of the anti-abrasion element.

However, these means for reducing friction can also be arranged to act between the flexible pressure chamber element and the additional anti-abrasion element, whereby the mechanical abrasive load on the flexible pressure chamber element can again be reduced if the additional anti-abrasion element is able to move relative to the flexible pressure chamber element.

An advantageous variant provides that the anti-abrasion element comprises means for storing a lubricant. The lubricant storage means can advantageously provide a lubricant store, whereby lubricant, such as an oil or grease, can be provided on the suspension apparatus for a particularly long period of time.

In structural terms, the storage means can be configured in a particularly simple manner by means of pores of the cellular polyurethane, so that ideally there is no need whatsoever for an additional, external supply.

The object of the invention is also achieved by a vehicle seat comprising a seat part, a backrest part and a seat substructure, in which seat the seat substructure is arranged on a bodywork part of the motor vehicle and the vehicle seat being characterised by a vehicle vibration device according to any of the features described herein or to any of the combination of features described herein.

With regard to a vehicle seat, the present vehicle vibration device allows for an extremely compact seat substructure construction with very good suspension and damping properties.

In addition, the object of the invention is also achieved by a vehicle cab of a motor vehicle, comprising a vehicle vibration device for the spring-loaded mounting of the vehicle cab on a part of the motor vehicle body, the vehicle cab being characterised by a vehicle vibration device according to any of the features described herein or to any of the combination of features described herein.

The present vehicle vibration device also advantageously allows a vehicle cab as a whole to be mounted in a spring-loaded and damping manner with respect to the vehicle body.

Further advantages, aims and properties of the present invention will be explained with reference to the accompanying drawings and the following description, both of which show and describe, by way of example, a vehicle vibration device, having a horizontal suspension apparatus, installed in a seat substructure of a vehicle seat. In the drawings:

DETAILED DESCRIPTION

Figure 1:
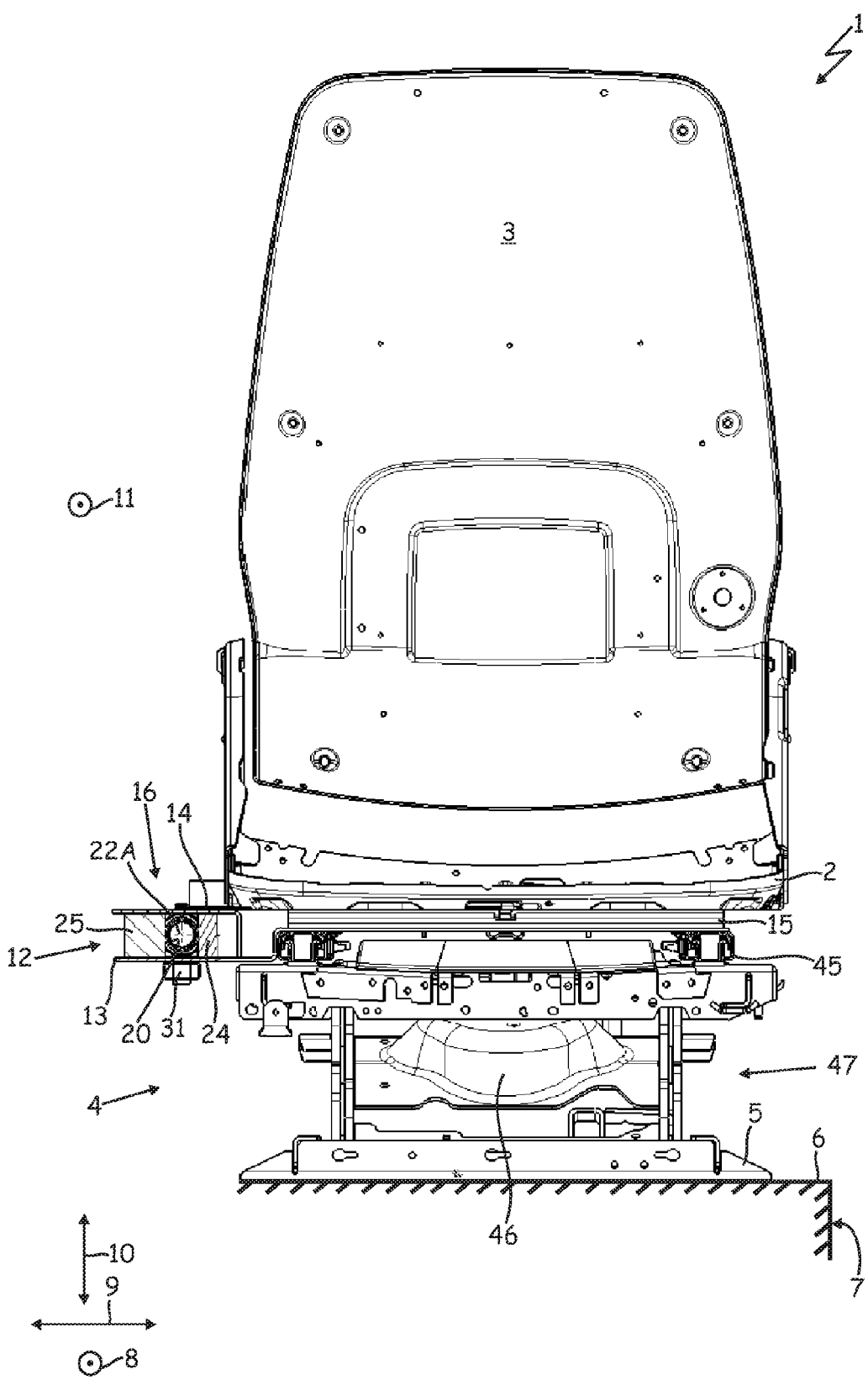
FIG. 1 is a schematic, partial sectional view from the front of a vehicle seat installed in a commercial vehicle, comprising a vehicle vibration device, in a non-deflected state, having a horizontal suspension apparatus.

The vehicle seat 1 shown in FIG. 1 comprises a seat part 2, a backrest part 3 and a seat substructure 4, which is fastened to a bodywork part 6 of a commercial vehicle 7 by a plate part 5.

Here, the commercial vehicle 7 defines a vehicle longitudinal extension 8, a vehicle width extension 9 and a vehicle height extension 10, the vehicle seat 1 being orientated within the commercial vehicle 7 such that the main seating direction 11 of the vehicle seat 1 is aligned with the vehicle longitudinal direction 8.

The seat substructure 4 comprises a vehicle vibration device 12, by means of which the seat part 2 and the backrest part 3 can vibrate horizontally in the direction of the vehicle width extension 9.

In this embodiment, the vehicle vibration device 12 comprises a plate-shaped lower part 13 and a plate-shaped upper part 14. The upper part 14 is arranged so as to be deflectable in translation relative to the lower part 13 by means of a pair of rails 15, the pair of rails 15 being arranged between the upper part 14 and the lower part 13.

The vehicle vibration device 12 additionally comprises a horizontal suspension apparatus 16, by means of which the lower part 13 and the upper part 14 are interconnected in a spring-loaded manner such that in particular the seat part 2 can vibrate relative to the body part 6, in this case in the direction of the vehicle width extension 9.

Naturally, in a corresponding embodiment of the vehicle vibration device 12 or respectively in an arrangement of said horizontal suspension apparatus 16 or of an additional horizontal suspension apparatus 16, the upper part 14 can additionally or alternatively also vibrate in the direction of the vehicle longitudinal extension 8 relative to the lower part 13.

Figure 2:
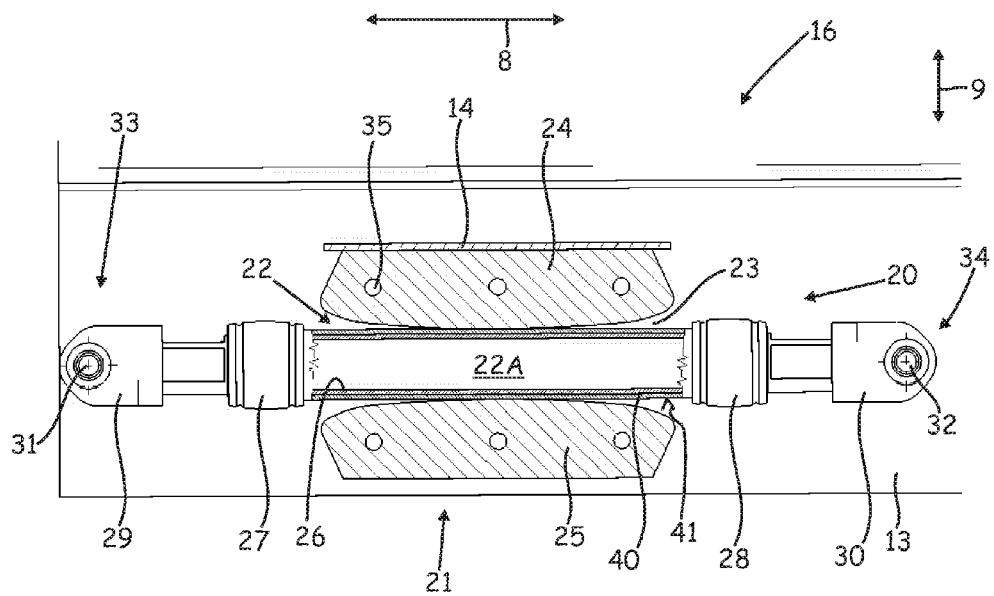
FIG. 2 is a schematic plan view of the horizontal suspension apparatus of the vehicle vibration device from FIG. 1 in the non-deflected state.

The horizontal suspension apparatus 16 is equipped with a deformable fluid spring part 20 (see also FIG. 2 in particular) and a deformation apparatus 21 for this purpose, so as to allow suspension between the upper part 14 and the lower part 13.

The deformable fluid spring part 20 has a flexible pressure chamber element 22 which has a pressure chamber 22A and is mounted in a deformation space 23 between two deformation elements 24 and 25 of the deformation apparatus 21 such that it is deformed by the two deformation elements 24 and 25 when the upper part 14 is deflected relative to the lower part 13 in the vehicle width direction 9.

Advantageously, the spring characteristic of the horizontal suspension apparatus 16 can be modulated in many different ways by means of the pressure in the pressure chamber 22A.

In particular by means of the deformable fluid spring part 20, damping properties can also be advantageously adjusted on the horizontal suspension apparatus 16.

The flexible pressure chamber element 22 is characterised by a tubular casing part 26 which is connected in a pressure-tight manner to a first end enclosure 27 and to a second end enclosure 28 of the deformable fluid-spring part 20, in each case by means of a clamping screw connection (not shown here).

The end enclosures 27 and 28 are each fixed to the lower part 13 by a bearing eyelet element 29 and 30 respectively and an expansion bolt connection 31 and 32 respectively, so that the deformable fluid-spring part 20 of the horizontal suspension apparatus 16 is fastened to the lower part 13 of the vehicle vibration device 12 by means of its two ends 33 and 34.

By contrast, the deformation elements 24 and 25, which form the deformation space 23, are rigidly connected to the upper part 14 of the vehicle vibration device 12 by screw connections 35 (only given a reference numeral here by way of example).

The flexible pressure chamber element 22 and the tubular casing part 26 respectively consist of a rubber material reinforced with polyamide fabric. The flexible pressure chamber element 22 and the tubular casing part 26 respectively are subjected to high mechanical stress by the deformation contact with the two deformation elements 24 and 25.

Figure 3:
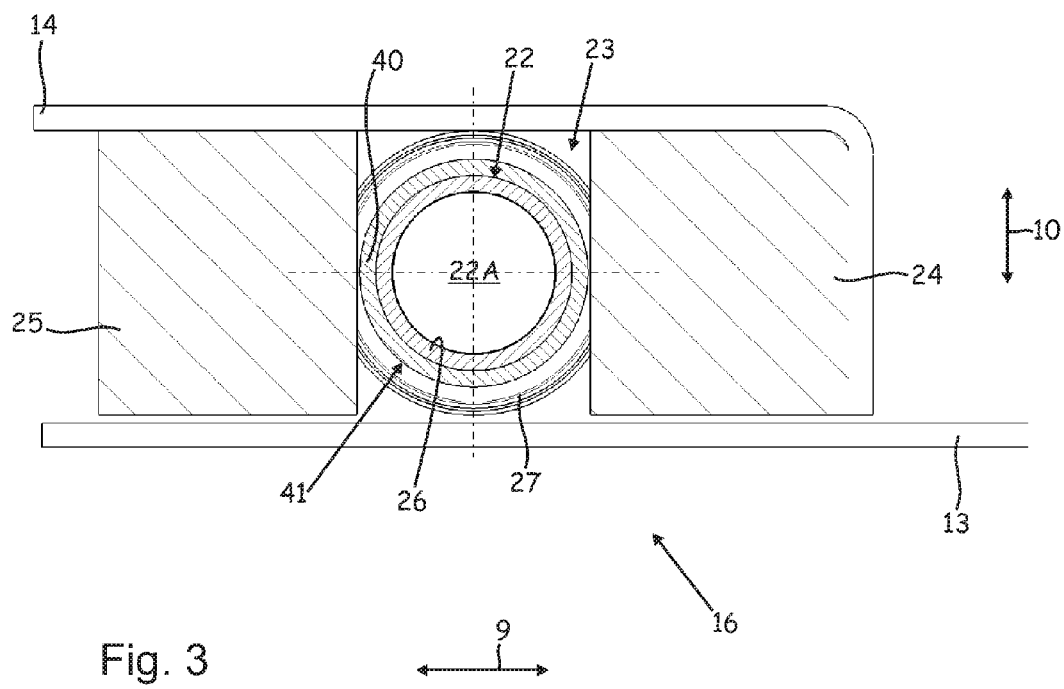
FIG. 3 is a schematic sectional view of the horizontal suspension apparatus from FIGS. 1 and 2.

In order to better protect in particular the rubber material from mechanical stress of this type, an additional anti-abrasion element 40 (see in particular FIG. 3) is arranged between the flexible pressure chamber element 22 and the deformation elements 24 and 25.

In this embodiment, the additional anti-abrasion element 40 is produced from the cellular polyurethane Cellasto®, specifically in the form of a tubular protective sleeve element 41 which is pulled over the tubular casing part 26.

Whereas the tubular material 26 is rigidly connected to the end enclosures 27 and 28 respectively, the tubular protective sleeve element 41 is only loosely arranged or pulled over these end enclosures 27 and 28 respectively to allow for very easy assembly, and possibly even retrofitting. In this respect, the tubular protective sleeve element 41 can also be replaced without difficulty either when it reaches its wear limit or prior to this.

In order to be able to advantageously reduce friction in particular between the tubular protective sleeve element 41 and the deformation elements 24 and 25, the tubular protective sleeve element 41 can additionally be provided with a lubricant (not shown) as a means for reducing friction with respect to the deformation elements 24 and 25 respectively.

The tubular protective sleeve element 41 made from the cellular polyurethane Cellasto® advantageously has a sufficiently high number of pores in which lubricant can be stored. In this respect, the tubular protective sleeve element 41 also provides a plurality of store-like means for storing the lubricant.

In this respect, the present additional anti-abrasion element 40 is particularly well suited to protecting the flexible pressure chamber element 22 from a critical mechanical wear load as a result of the two deformation elements 24 and 25.

As can be seen particularly well in the view according to FIG. 1, in this embodiment the upper part 14 of the vehicle vibration device 12 is fastened to the seat part 2.

By contrast, the lower part 13 of the vehicle vibration device 12 is fastened to an additional pair of rails 45 of a scissor-action frame 47 equipped with a vertical pneumatic spring apparatus 46, and these are positioned between the vehicle vibration device 12 and the plate part 5. The scissor-action frame 47 and the vertical pneumatic spring apparatus 46 allow for vertical suspension of the seat part 2 and the backrest part 3 in the direction of the vehicle height extension 10.

Naturally, the embodiment outlined above is merely a first configuration of the vehicle vibration device according to the invention. In this respect, the configuration of the invention is not limited to this embodiment.

All of the features disclosed in the application documents are claimed as being essential to the invention, insofar as they are novel over the prior art either in isolation or in combination.

LIST OF REFERENCE NUMERALS

1 Vehicle seat
2 Seat part
3 Backrest part
4 Seat substructure
5 Plate part
6 Bodywork part
7 Commercial vehicle
8 Vehicle longitudinal extension
9 Vehicle width extension
10 Vehicle height extension
11 Main seating direction
12 Vehicle vibration device
13 Lower part
14 Upper part
15 Pair of rails
16 Horizontal suspension apparatus
20 Deformable fluid spring part
21 Deformation apparatus
22 Flexible pressure chamber element
22A Pressure chamber
23 Deformation space
24 First deformation element
25 Second deformation element
26 Tubular casing part
27 First end enclosure
28 Second end enclosure
29 First bearing eyelet element
30 Second bearing eyelet element
31 First expansion bolt connection
32 Second expansion bolt connection
33 First end
34 Second end
35 Screw connections
40 Additional anti-abrasion element
41 Tubular protective sleeve element
45 Additional pair of rails
46 Vertical pneumatic spring apparatus
47 Scissor-action frame

What is claimed is:

1. A vehicle vibration device of a vehicle seat or of a vehicle cab, comprising:
    a lower part; and
    an upper part which can be deflected relative to this lower part, in which device the upper part and the lower part are interconnected in a spring-loaded manner by means of at least one suspension apparatus and in which the suspension apparatus comprises a deformable fluid spring part having a flexible pressure chamber element and a deformation apparatus having deformation elements, the deformable fluid element being deformed by the deformation elements at least in part when the upper part is deflected relative to the lower part, wherein an additional anti-abrasion element is arranged between the flexible pressure chamber element and the deformation elements.

2. The vehicle vibration device according to claim 1, wherein the anti-abrasion element is produced from a cellular polyurethane, in particular from Cellasto® or Sylomer®.

3. The vehicle vibration device according to claim 1, wherein the anti-abrasion element has a tubular protective sleeve element in which at least part of the deformable fluid spring part is arranged.

4. The vehicle vibration device according to claim 1, wherein the anti-abrasion element is loosely pulled over the flexible pressure chamber element as far as over end enclosures thereof.

5. The vehicle vibration device according to claim 1, wherein the anti-abrasion element consists of a flock coating.

6. The vehicle vibration device according to claim 1, wherein the anti-abrasion element comprises means for reducing friction with respect to the deformation elements.

7. The vehicle vibration device according to claim 1, wherein the anti-abrasion element comprises means for storing a lubricant.

8. The vehicle vibration device according to claim 1, wherein the flexible pressure chamber element is produced, so as to be expandable, from a rubber material reinforced with a polyamide fabric.

* * * * *